United States Patent [19]

Kanamaru et al.

[11] Patent Number: 4,541,315
[45] Date of Patent: Sep. 17, 1985

[54] INSIDE CHUCK DEVICE FOR MACHINE TOOLS

[75] Inventors: Hisanobu Kanamaru; Akira Tohkairin, both of Katsuta; Takuzo Kurosawa, Hitachi, all of Japan

[73] Assignees: Hitachi, Ltd.; Kawamura Co., Ltd., both of Tokyo, Japan

[21] Appl. No.: 600,953

[22] Filed: Apr. 16, 1984

Related U.S. Application Data

[63] Continuation of Ser. No. 279,021, Jun. 30, 1981, abandoned.

[30] Foreign Application Priority Data

Mar. 26, 1980 [JP] Japan ................................. 55-37430

[51] Int. Cl.⁴ ............................................. B23B 33/00
[52] U.S. Cl. ................................... 82/40 R; 279/1 E; 279/1 R
[58] Field of Search ..................... 409/232, 234, 231; 408/68; 279/1 R, 1 L, 1 S, 1 E, 96, 76, 102, 103, 105, 2 R, 1 SG, 1 ME, 28; 82/40, 41, 43, 44, 2.5; 29/525, 426.5, 559; 242/41, 68.1; 72/344, 358, 370, 470

[56] References Cited

U.S. PATENT DOCUMENTS

| 1,446,305 | 2/1923 | Howe .................................. 82/2.5 |
| 3,096,989 | 7/1963 | Fallon ................................. 82/40 R |
| 3,753,570 | 8/1973 | Espasa ............................. 82/40 R X |
| 4,376,333 | 3/1983 | Kanamura et al. ............... 29/525 X |
| 4,377,762 | 3/1983 | Tatsumi et al. ................... 29/525 X |

FOREIGN PATENT DOCUMENTS

| 1099821 | 2/1961 | Fed. Rep. of Germany ..... 82/40 R |
| 00001924 | 1/1980 | Japan ................................. 29/525 |
| 2045123 | 10/1980 | United Kingdom ............ 279/1 ME |
| 917945 | 4/1982 | U.S.S.R. .......................... 279/1 E |

Primary Examiner—William R. Briggs
Attorney, Agent, or Firm—Antonelli, Terry & Wands

[57] ABSTRACT

An inside chuck device for machine tools, adapted to chuck a cylindrical work having an axial bore at the peripheral surface of the bore of the work. The chuck device has a chuck having a guide portion adapted to be received by the axial bore of the work so as to guide and center the latter, and a plurality of radial projections. Each of the projections has such a height that the circle contacting the outer side of the projections has a diameter at least 0.02 mm greater than the inside diameter of the work.

4 Claims, 11 Drawing Figures

INSIDE CHUCK DEVICE FOR MACHINE TOOLS

This is a continuation of application Ser. No. 279,021 filed June 30, 1981 now abandoned.

BACKGROUND OF THE INVENTION

The present invention relates to a chuck device of a machine tool and, more particularly, to an inside chuck device adapted to carry a workpiece on an outer periphery thereof.

A collet chuck device is broadly known and used as the inside chuck device of machine tools. This collet chuck device has a collet provided at its one end with a tapered bore and a plurality of axial slits and a tapered shaft adapted to make a sliding fit with the tapered bore. As the tapered shaft is slid into the tapered bore, the end portion of the collet having the axial slits is expanded radially outwardly so that the outer peripheral surface of the collet is pressed against the inner peripheral surface of a bore of a cylindrical workpiece to hold the latter. This collet chuck, however, has various drawbacks. Namely, if the bore of the workpiece is not finished in exactly circular form, it is not possible to obtain a uniform engagement between the collet and the work resulting in an unstable holding of the workpiece. In addition, since the collet itself lacks rigidity, the collet is deflected in the direction perpendicular to the axis of the workpiece to permit a slip between the work and the collet to make the machining difficult.

SUMMARY OF THE INVENTION

Accordingly, an object of the invention is to provide an inside chuck device of machine tool, capable of stably and firmly holding the workpiece.

To this end, according to the invention, there is provided an inside chuck device of machine tools comprising a spindle bed, a spindle rotatably mounted on said spindle bed and adapted to be rotatably driven by a power source, and a mandrel chuck fixed to one end of said spindle and adapted to chuck the workpiece. The mandrel chuck is provided at its end portion with a guide portion of a diameter smaller than the diameter of the bore in the workpiece and having a plurality of projections formed on the outer peripheral surface thereof, with a diameter of the circle contacting the radially outer ends of said projections being at least greater than the diameter of the bore in the workpiece, so that the wall of the bore in the workpiece is locally plastically deformed as the workpiece is pressed against the chuck, whereby the workpiece is chucked stably and accurately in both of the rotational and axial directions.

The above and other objects, as well as advantageous features of the invention will become clear from the following description of the preferred embodiments taken in conjunction with the accompanying drawings.

DESCRIPTION OF THE PREFERRED EMBODIMENTS

Figure 1:
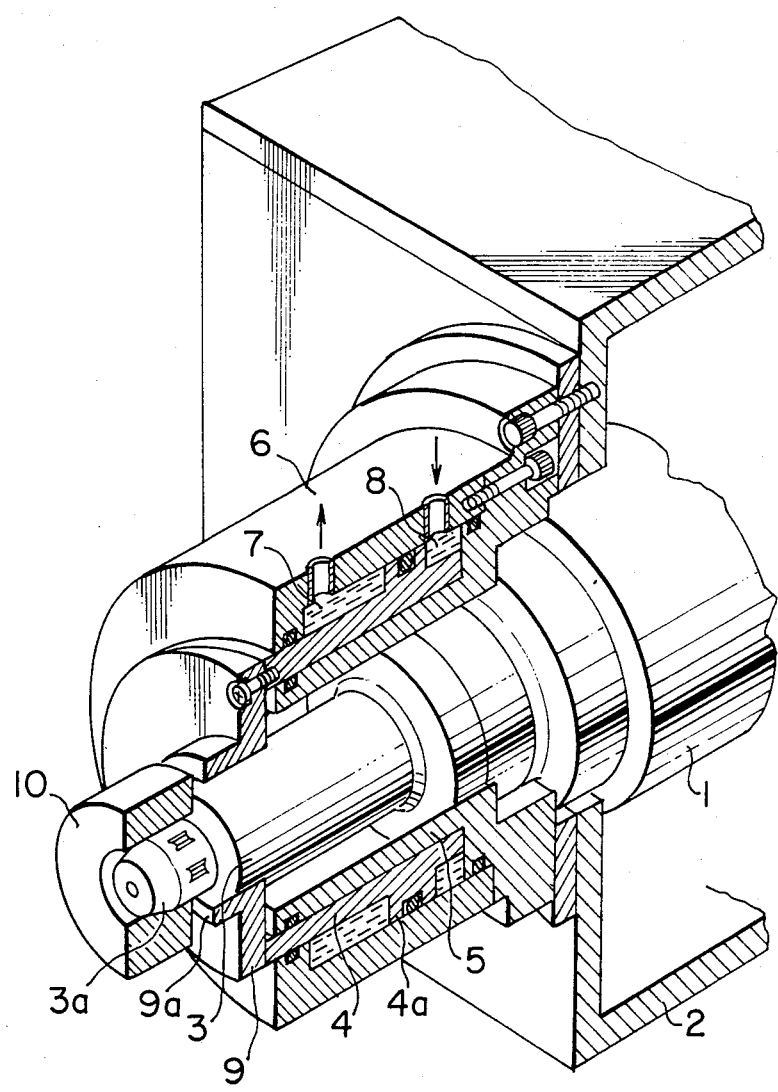
FIG. 1 is a partial cross-sectional perspective view of an inside chuck device constructed in accordance with an embodiment of the invention.

Referring first to FIG. 1, the inside chuck device has a spindle 1 carried by a spindle bed 2. A mandrel chuck 3a is fixed to a chuck mount 3 which, in turn, is secured by screws (not shown) to one end of the spindle 1. An inner peripheral sleeve 5 is fixed at its one end by screws (not shown) to the spindle bed 2, and is disposed around the chuck mount 3 to maintain an annular space therebetween. A cylindrical piston 4, fitted around the inner peripheral sleeve 5, has a collar 4a which, in turn, fits through a peripheral sealing member in the inner peripheral surface of an outer peripheral sleeve 6. Within the outer peripheral sleeve 6, defined at both sides of the collar 4a, are pressure chambers 7 and 8 which, in turn, are communicated with a hydraulic pressure source (not shown) through passages formed in the wall of the outer peripheral sleeve 6.

A T-shaped workpiece force-out pipe 9 is fixed to the outer end surface of the cylindrical piston 4. When the workpiece force-out pipe 9 is in a normal or retracted position, the end 9a of the force-out pipe 9 is positioned inwardly of the inner surface of a work 10.

Figure 2:
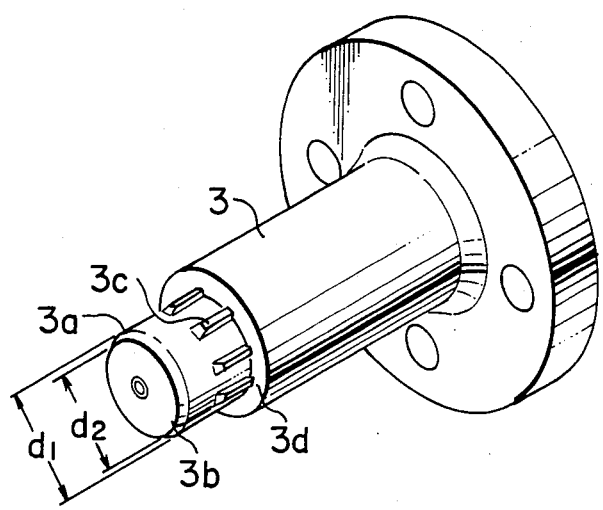
FIG. 2 is a perspective view of an inside chuck device shown in FIG. 1.
Figure 3:
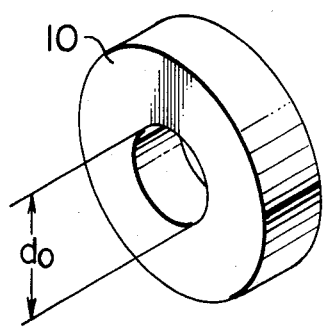
FIG. 3 is a perspective view of a workpiece chucked by the inside chuck device shown in FIG. 1.
Figure 4:
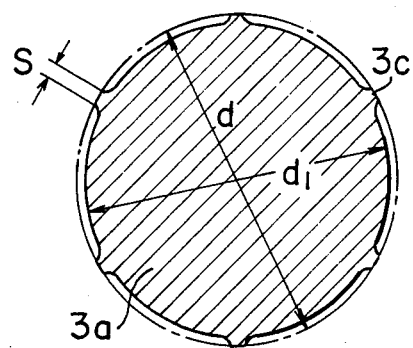
FIG. 4 is a partial cross sectional enlarged view of the chuck portion of the inside chuck device shown in FIG. 1.
Figure 5:
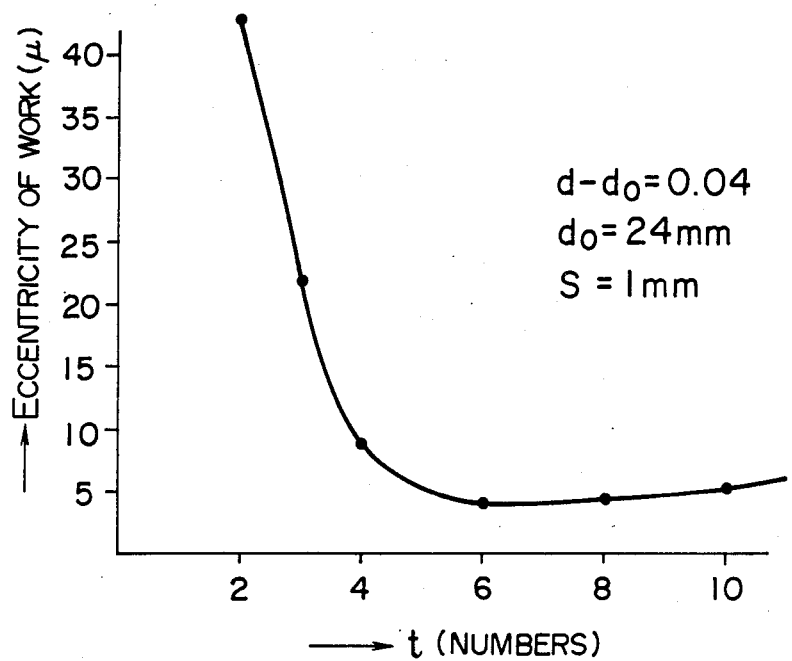
FIG. 5 is a graph showing the relationship between the number of projections on the chuck device and the state of engagement between the workpiece and the chuck device.
Figure 6:
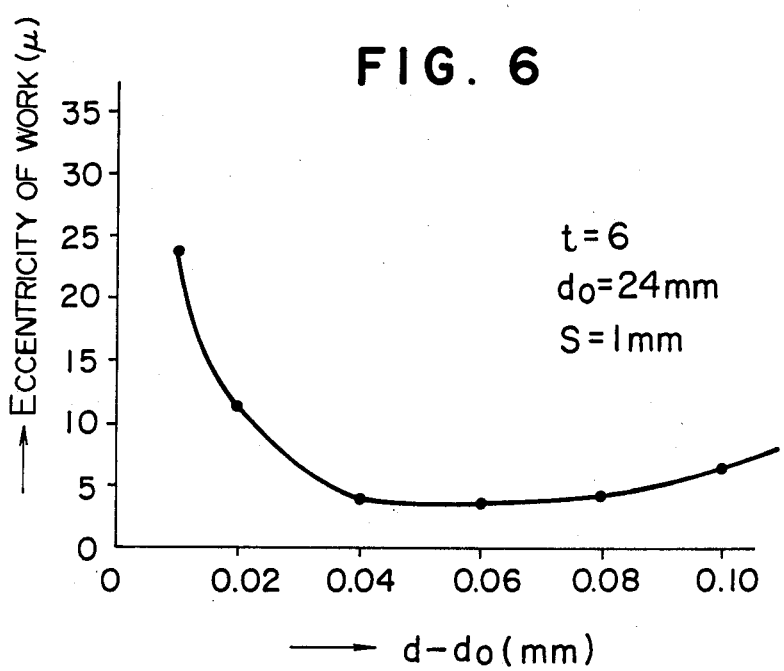
FIG. 6 is a graph showing the relationship between the height of the projections on the chuck and the state of engagement between the workpiece and the chuck device.

The relationship between the mandrel chuck 3a and the workpiece 10 will be explained hereinafter with specific reference to FIGS. 2 to 6. The mandrel chuck 3a is secured to the chuck mount 3 through a key (not shown). The mandrel chuck 3a is provided at its end with a guide portion 3b having an outside diameter $d_2$ smaller than the diameter $d_1$ of the main part of the chuck 3a. Also, a plurality of radial projections 3c (See FIG. 4) are formed on the chuck 3a at a portion of the chuck 3a spaced rearwardly from the end of the guide portion 3b. As shown in FIGS. 3 and 4, a circle contacting the outer ends of the projections 3c has a diameter d greater than the inside diameter $d_0$ of the workpiece 10. In the illustrated embodiment, there are six projections 3c provided at a regular circumferential interval. Each projection 3c has a circumferential width s of 1 mm. However, the number of the projections 3c is not exclusive and can suitably be determined in accordance with various factors such as the wall thickness of the material. For instance, assuming here that the inside diameter $d_0$ of the workpiece 10 is 24 mm, the height of the projection, i.e. $d-d_0$, is 0.04 mm and that the circumferential width s of each projection is 1 mm, it is understood that the number of the projections are preferably four or more, from the view point of the centering of the workpiece 10. To the contrary, assuming that the number of the projections 3c is six and the inside diameter $d_0$ of the work is 24 mm, it is understood that the height $d-d_0$ of the projection 3c is preferably 0.02 mm or greater, for obtaining a good centering of the workpiece 10.

In the chuck device of the invention, since the chucking operation relies upon a plastic deformation of the workpiece 10, the mandrel chuck 3a is preferably made to have the projections on its outer peripheral surface in one body from a hard metal or die steel (SKD 11).

Figure 7:
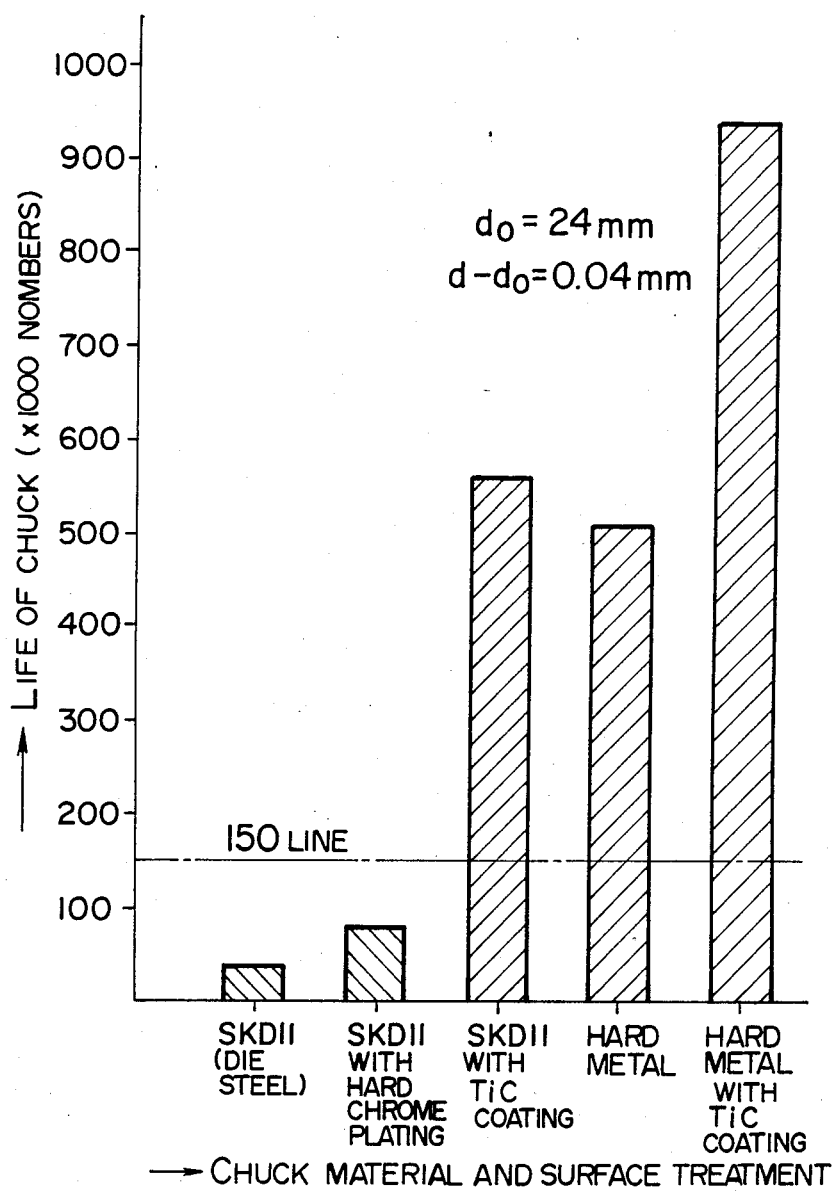
FIG. 7 is a graph showing the relationship between the kind of material of the chuck and the life of the same.

For further increasing the hardness of the projections 3c, the outer periphery of the chuck 3a is preferably coated with titanium carbide (TiC). The chuck 3a made from dies steel coated with titanium carbide exhibits a long life equivalent to or superior to that shown by the chuck made from hard metal, which is more than several times longer than that of the chuck made from the dies steel with or without chromium plating layer. As will be seen from FIG. 7, the chuck made of hard metal and coated with titanium carbide exhibits a life which is about twice as long as that of the chuck made from the same material and having no coating.

It is not essential that the coating with titanium carbide is effected over the entire periphery of the mandrel chuck 3a. Namely, a titanium carbide coating provided only on the projections 3c provides a satisfactorily long life of the chuck 3a.

A description will be made hereinafter as to how the workpiece 10 is mounted, with specific reference to FIGS. 1 to 3. First of all, the bore of the workpiece 10 is slid onto the guide portion 3b of the mandrel chuck 3a and is further forced into contact with the step surface 3d of the chuck 3a by hydraulic pressure of the like. In this state, the projections 3c evenly bite into the inner peripheral surface of the workpiece 10 to cause a local plastic deformation of the latter. In consequence, the work 10 is firmly and stably chuck by the chuck 3a.

As will be understood from the foregoing description, the projections 3c themselves, working in place of conventional collet, are kept in predetermined positional relationship irrespective of the circularity of the outer periphery of the workpiece 10, so that the centering of the workpiece 10 is achieved at a high precision. The workpiece 10 is prevented from moving either in the axial direction or in the rotational direction when it is chucked by the chuck device of the invention, so that the cutting of the outer peripheral surface is made in quite a stable and accurate manner.

After the cutting, the hydraulic pressure is introduced into the right-side pressure chamber 8 shown in FIG. 1 to cause an axial movement of the cylindrical piston 4 to permit the workpiece 10 to be demounted from the mandrel chuck 3a.

Figure 8:
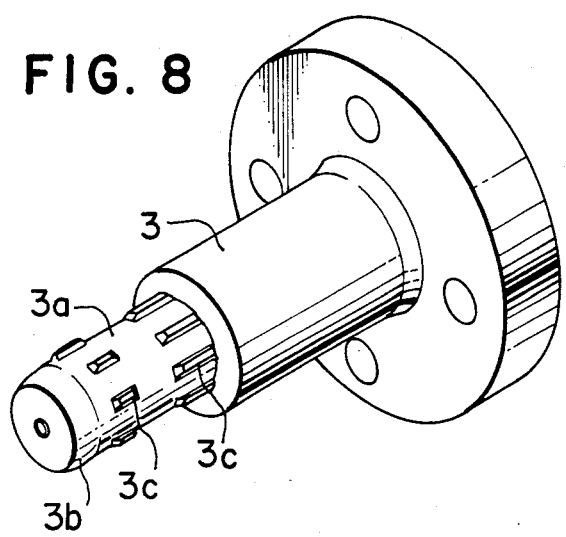
FIG. 8 is a perspective view of a chuck constructed in accordance with another embodiment of the invention.

For workpieces having long axial bores, the chuck 3a shown in FIG. 8 preferably has a large axial length, and is provided with a plurality of groups of projections $3c_1$, $3c_2$ spaced in the axial direction in a stepped manner. For facilitating the insertion of the workpiece, the projections $3c_1$ of the group near the end of the chuck 3a have a height smaller than the height of the projections $3c_2$ of the group remote from the end of the chuck 3a. By such an arrangement, it is possible to obtain a uniform distribution of the local stresses generated by the projections $3c_1$ of the group adjacent to the end of the chuck 3a so as to attain an easy press-fitting of the workpiece 10.

Figure 9:
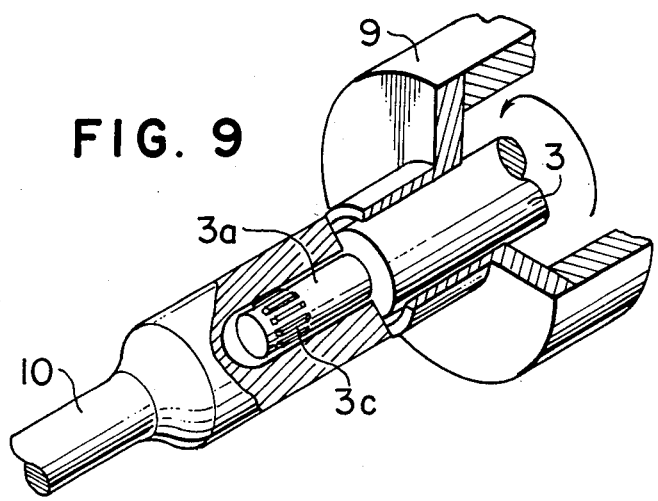
FIG. 9 is a partial cross-sectional view of still another embodiment of the present invention, showing particularly the state of connection between the chuck and the workpiece.
Figure 10:
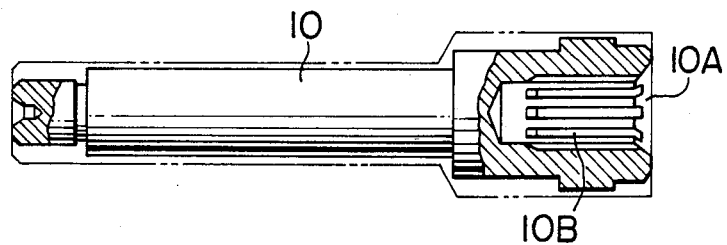
FIG. 10 is a partial sectional view of a workpiece formed by the chuck device shown in FIG. 9.

By suitably selecting and designing the size and shape of the projections $3c_1$, $3c_2$ it is possible to form spline grooves 10B in the surface of the bore 10A of the workpiece 10, as will be seen from FIGS. 9 and 10, while chucking the workpiece 10 by the chuck device of the invention. Thus, the chucking device of the invention can effectively be used also for forming the spline grooves provided that the shape of the spline grooves is simple.

Figure 11:
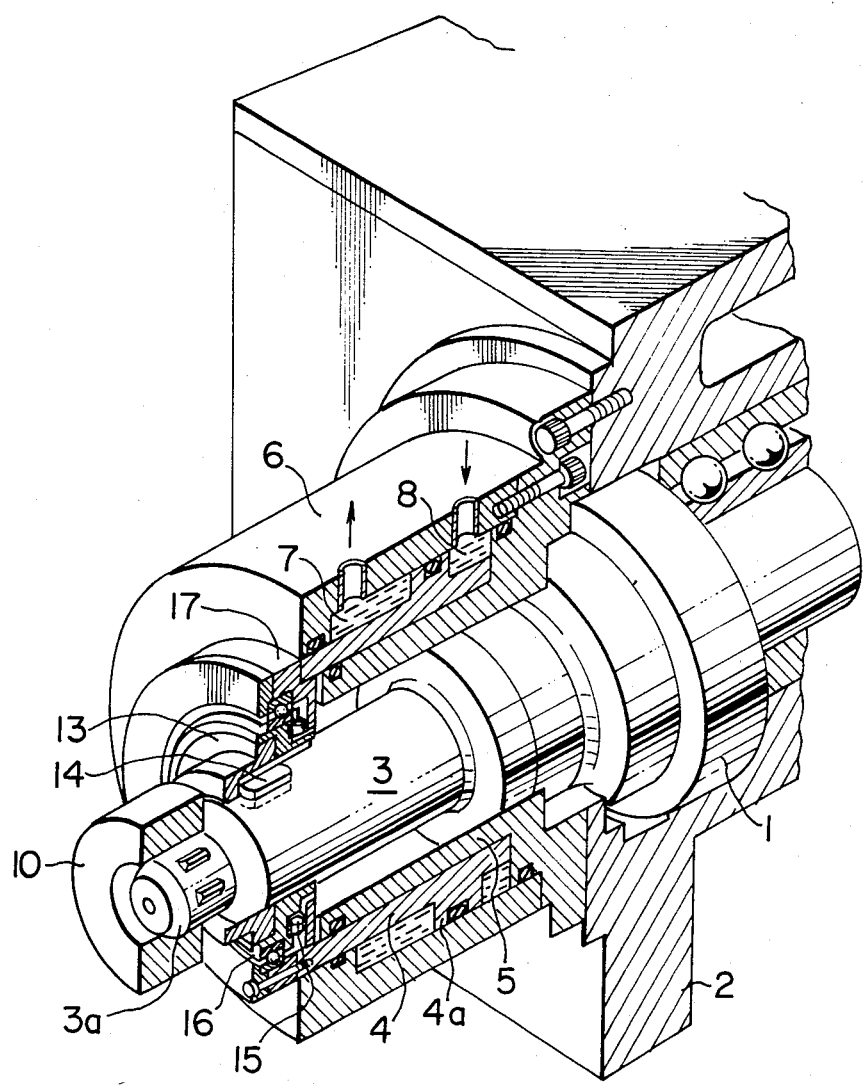
FIG. 11 is a partial cross-sectional perspective view of an inside chuck device having an improved work releasing mechanism.

As shown in the embodiment of; FIG. 11 shows a modification of the chuck a chuck device has a basic construction substantially identical to that shown in FIG. 1, except that the workpiece force-out pipe 13 is engaged by the chuck mount 3 through a slide key 14. The force-out pipe 13 is engaged also by a flange 17 fixed to the end of the cylindrical piston 4, through the medium of a thrust bearing 15 and a radial bearing 16. Consequently, the workpiece force-out pipe 13 is allowed to rotate as a unit with the spindle 1 and the chuck mount 3. The workpiece force-out pipe 13 is displaced, when it is desired to release the workpiece, in the axial direction rotating at the same speed as the workpiece thereby to permit the workpiece to be released. According to this arrangement, it is possible to release the workpiece without damaging the latter.

What is claimed is:

1. An inside chuck device for machine tools, the inside chuck device comprising:
   a spindle rotatably carried by a spindle bed and provided at its end portion with a chuck mount;
   a mandrel chuck formed of a hard metal and concentrically secured to an end of said chuck mount, said mandrel chuck including a guide portion for guiding and centering a workpiece and a plurality of axially extending projections provided on an outer periphery of a chuck portion adjacent to said guide portion;
   a force-out pipe concentrically disposed and axially slidably provided on an outer periphery of said chuck mount for urging an end surface of said workpiece by an external force; and, wherein a workpiece having an inside diameter substantially equal to an outside diameter of said chuck is press fitted to the chuck to plastically deform the workpiece for chucking the latter.

2. An inside chuck device as claimed in claim 1, wherein said force-out pipe is axially slidably provided on said chuck mount and is rotated at the same speed as the workpiece.

3. An inside chuck device as claimed in claim 1, wherein said projections are provided in at least two groups, and wherein projections of a group adjacent to the end of the chuck have a smaller radial length than that of the projections of the other group.

4. An inside chuck device as claimed in claim 3, wherein said force-out pipe is axially slidably provided on said chuck mount and rotated at the same speed as the workpiece.

* * * * *